United States Patent
Mann et al.

(10) Patent No.: US 6,186,262 B1
(45) Date of Patent: Feb. 13, 2001

(54) HYDROSTATIC MECHANICAL WHEEL DRIVE

(75) Inventors: Egon Mann; Wolfgang Gebhard, both of Friedrichshafen (DE)

(73) Assignee: ZF Friedrichshafen AG, Friedrichshafen (DE)

(*) Notice: Under 35 U.S.C. 154(b), the term of this patent shall be extended for 0 days.

(21) Appl. No.: 09/254,566

(22) PCT Filed: Sep. 10, 1997

(86) PCT No.: PCT/EP97/04942

§ 371 Date: Mar. 8, 1999

§ 102(e) Date: Mar. 8, 1999

(87) PCT Pub. No.: WO98/10951

PCT Pub. Date: Mar. 19, 1998

(30) Foreign Application Priority Data

Sep. 14, 1996 (DE) .............................. 196 37 570

(51) Int. Cl.[7] ............................................. B60K 7/00
(52) U.S. Cl. .................... 180/308; 188/82.9; 188/170; 180/370; 475/900
(58) Field of Search .................. 475/900; 192/69.8; 188/82.9, 170; 180/242, 370, 307, 308

(56) References Cited

U.S. PATENT DOCUMENTS

| | | | |
|---|---|---|---|
| 4,114,737 | 9/1978 | Fukui | 192/3 N |
| 4,213,514 | 7/1980 | Ehrlinger et al. | 180/308 |
| 4,245,724 | * 1/1981 | Beck | 188/170 X |
| 4,254,845 | 3/1981 | Braun | 180/306 |
| 4,610,331 | * 9/1986 | Rogier et al. | 188/170 X |
| 4,633,991 | * 1/1987 | Hanks et al. | 192/69.8 X |
| 5,114,324 | * 5/1992 | Spindeldreher | 188/170 X |
| 5,203,616 | * 4/1993 | Johnson | 188/170 X |
| 5,333,705 | * 8/1994 | Lemaire et al. | 188/170 X |
| 5,458,402 | * 10/1995 | Jeffrey | 188/170 X |

FOREIGN PATENT DOCUMENTS

| | | |
|---|---|---|
| 19 38 452 | 3/1966 | (DE) . |
| 27 39 994 | 9/1977 | (DE) . |
| 27 44 977 | 4/1979 | (DE) . |
| 42 35 710 A1 | 4/1994 | (DE) . |
| 195 03 477 A1 | 8/1996 | (DE) . |
| 2655091 | * 5/1991 | (FR) ................. 188/170 |
| 2672940 | * 8/1992 | (FR) ................. 188/170 |
| 94/18451 | 8/1994 | (WO) . |

OTHER PUBLICATIONS

Zahnradfabrik Passau GmbH, "ZF–Reduplan–Getriebe Für den Fahrantrieb in Raupenfahrzeugen", Prospectus F 43421/RT 3391–383 f, 1991, p. 4.

* cited by examiner

Primary Examiner—Michael Mar
(74) Attorney, Agent, or Firm—Davis and Bujold

(57) ABSTRACT

In a wheel drive with a radial-piston motor (5) and a planet gear (4) a wheel hub (3) being placed on a wheel hub support (1) by means of wheel bearings (10). The wheel hub support (1) can be joined to a transmission connector (4) in a single piece and is fastened to a vehicle chassis support. A dog tooth brake (7) is located on the side of the wheel drive facing the vehicle and serves as parking brake. In a cover (2) for a hydraulic connection of the radial-piston motor (5) are integrated valves for control of the radial-piston motor (5) and of the brake (7). Short lines and delay times occur as result. The cover (2) contains inter alia a brake valve (58) for a hydraulic brake function and a displacement change-over valve (64) enabling certain cylinders (70) of the radial-piston motor (5) to be switched on or off.

12 Claims, 3 Drawing Sheets

HYDROSTATIC MECHANICAL WHEEL DRIVE

BACKGROUND OF THE INVENTION

The invention concerns a hydrostatic mechanical wheel drive.

Hydrostatic mechanical wheel drives are used in movable construction machinery and in vehicles for special functions such as dumping, heavy transport, fire fighting, etc. both for wheel and full-track vehicles. They actuate individual wheels or sprocket wheels for driving a caterpillar. The wheels are screwed on a flange of a wheel hub.

The radial space available for the individual wheel drive as a rule is limited by the inner wheel diameter or a pitch circle diameter for fixing bolts. The wheel diameters and pitch circle diameters cannot be enlarged at will, since otherwise the wheels would no longer fit in the vehicle and the expense for added parts would increase, for example, for the tracks, supports, etc., and in the steered wheels the angle of lock would be substantially limited. Within this radial limitation has to be housed, the wheel drive with its mechanical transmission gearing in the form of a planetary gear, with a wheel bearing, a hydraulic lifting piston motor, a cover for a hydraulic connection and with a brake of short axial length and low weight.

DE-A1 27 44 977 shows a wheel drive with an axial piston motor of the swash plate type which has a constant displacement capacity. A highly reducing toothed wheel gearing in the form of a two-step planetary gear makes possible small radial dimensions and a heavy load capacity by the use of tapered roller bearings. The latter are situated between the wheel hub and a wheel hub support in which the hydromotor is accommodated and are rigidly connected with the planet carrier. The length of course is considerable.

To increase the speed range of the vehicle for driving on the road, the wheel drives have a clutch by which individual wheel drives can be disconnected when driving on the road. The reduced total displacement capacity of the remaining wheel drives produces, with the delivery rate of the pump remaining the same, an increased driving speed, but with reduced torque. In addition, the clutch increases the weight considerably, the construction expense and the length of the wheel drive.

As a drive unit can be provided any kind of hydromotor including, for example, a radial-piston motor. Although their construction is axially short, these require more radial space. In addition, in the wheel drive known the drive shaft can extend through on the vehicle inner side in order to mount a brake thereon, and this would further increase the weight and length.

Also known is a wheel drive for a full-track vehicle (Prospectus F 43421/RT 3391-383f of Zahnradfabrik Passau GmbH of the year 1991) in which an axial-piston motor according of the swash plate type is situated in a housing designed as wheel hub support. The swash plate is tiltably supported in a swivel frame and its inclination to the axis of rotation of the axial-piston motor can be adjusted by a lever mechanism and a hydraulic piston whereby changes the displacement capacity and thus the speed of rotation of the axial-piston motor can be achieved. The swash plate can be infinitely varied, there sufficing for many applications two adjusting steps, namely, for a maximum and minimum displacement capacity. This is even advantageous when it is necessary during operation quickly to change between two speed ranges.

Between the housing and the swivel frame, axially offset relative to the axial-piston motor, is a parking brake of multiple disc design with automatic actuation to be closed by a plate spring and hydraulically opened. The brake is thus between the axial-piston motor and a toothed wheel gearing. Thereby, accessibility and cooling are impaired. In addition, the space available is so narrow that the brake cannot with sufficient reliability hold heavy vehicles on slopes.

The invention is based on the problem of providing a compact hydrostatic mechanical wheel drive with a quickly responsive control for a radial-piston motor and a brake which is also suitable for heavy vehicles.

SUMMARY OF THE INVENTION

In the wheel drive, according to the invention, a short axial length is obtained by using a radial-piston motor. Slow running radial-piston motors having a high torque are very smooth running. Additionally, the valves required for control are integrated in the cover for a hydraulic connection thus saving space. Thereby are obtained short connecting lines to the brake and to the radial-piston motor whereby response characteristics are improved.

The brake opens automatically when the pressure in a brake line exceeds a preset value, conveniently 10 at, and closes by spring tension when the pressure falls below said value in coordination with a brake valve which opens the feed lines to the radial-piston motor as soon as the brake has opened and closes the feed lines before the brake closes. In order that the brake cannot be overloaded, there is provided in the brake line a pressure-reducing valve which limits the maximum pressure to a value such as 20 at.

It is advantageous that the brake opens more quickly than it closes. For this purpose serves a first throttle check valve in the brake line which opens during an increasing pressure. Thereby the brake is quickly loaded by the checking function while the pressure during discharge drops more slowly via the throttle.

The brake as a rule serves as a parking brake. It can be designed as multi-disc brake or positive brake. The positive fit parking brake requires only a small space both in axial and in radial directions, since the retaining forces are applied by the positive locking. This is possible by selecting adequate materials of long service life and strength in a small space even for heavy vehicles. The spring for closing the brake and the hydraulic devices such as the brake piston have to be designed for engaging and disengaging forces only and not for stronger retaining forces.

The parts of the brake with the positive fit components are conveniently in a pressure chamber wherein the axially movable second part sits upon a brake piston which lies coaxially relative to an axis of rotation of the wheel drive. The brake piston is guided by the spring loaded end out from the pressure chamber directly or via a cylinder housing of the radial-piston motor which positively connects the second part with the sun gear shaft. The brake piston and the spring can be dimensioned so that they are housed within the control cover.

According to another proposal, the spring supports itself on a bearing for support of the radial-piston motor on the wheel hub support. Thereby the expense and space for the support can be reduced.

In addition to the mechanically acting brake, the wheel drive has a hydraulic braking function by means of a brake valve locking the return flow from the radial piston motor as soon as the pressure drops below the preset pressure, for example, 10 at. If the pressure increases in a supply line above said value, the brake valve is adjusted by a second throttle check valve to a position which again releases the return flow and thus switches off the braking function. Pressure-limiting valves protect the supply lines against overpressure. They are conveniently connected between the brake valve and the radial-piston motor.

In order to be able to drive the wheel motor in several speed ranges with different torques, a displacement change-over valve is provided which shuts off a feed line for some cylinders of the radial piston motor and can connect that feed line with a return flow line. The small displacement capacity of the radial-piston motor produced thereby results, while the displacement of the hydraulic pump remains the same, a higher speed of rotation with reduced torque.

Numerous features are shown and described in combination in the specification and in the claims. The expert will conveniently regard the combined features in accordance with the problems to be solved and combine them to form added combinations.

BRIEF DESCRIPTION OF THE DRAWINGS

One embodiment of the invention is illustrated in the drawing which shows.

Figure 1:
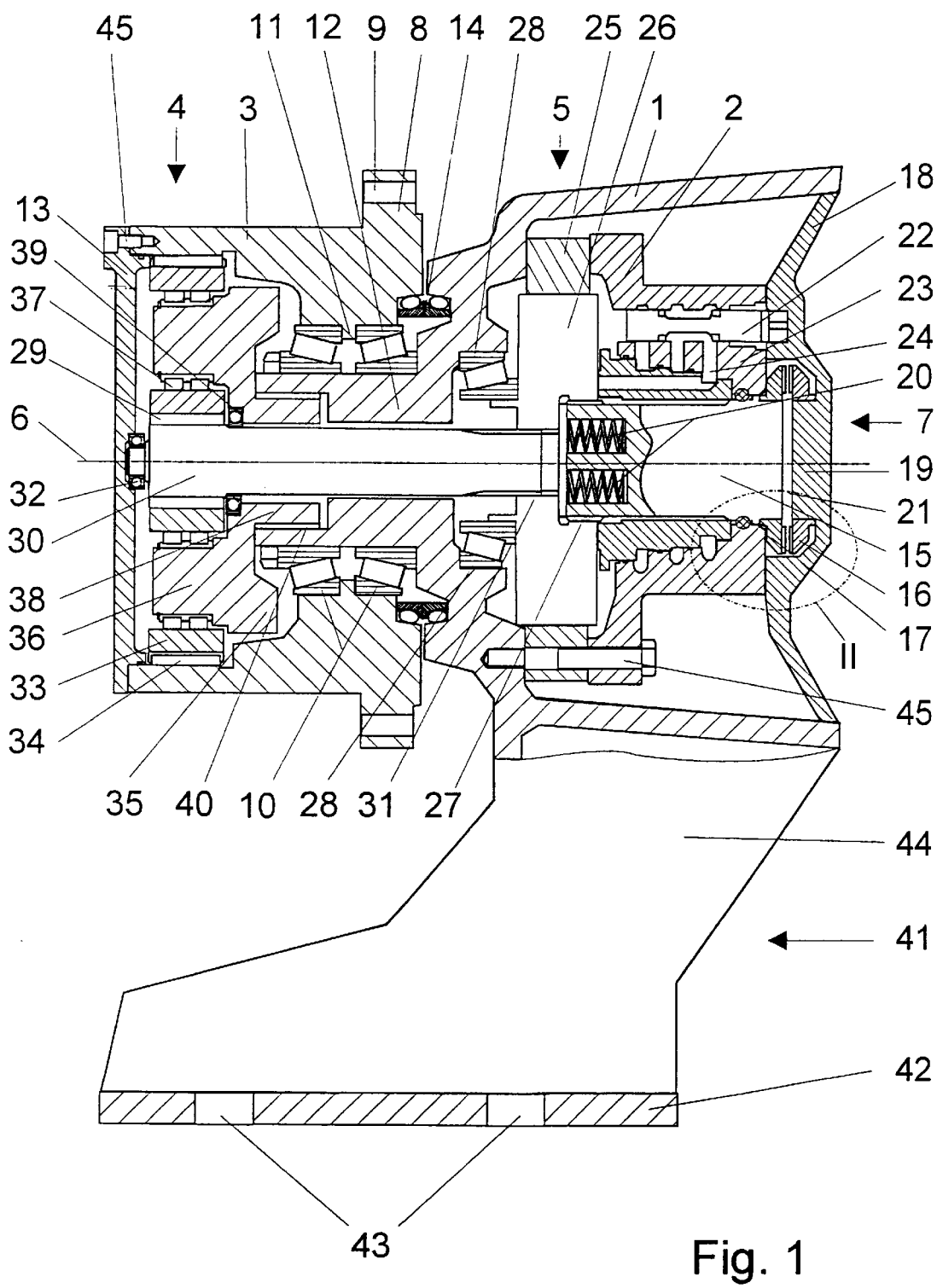
FIG. 1 is a cross-section through a wheel drive for tractors having a positive fit brake.
Figure 2:
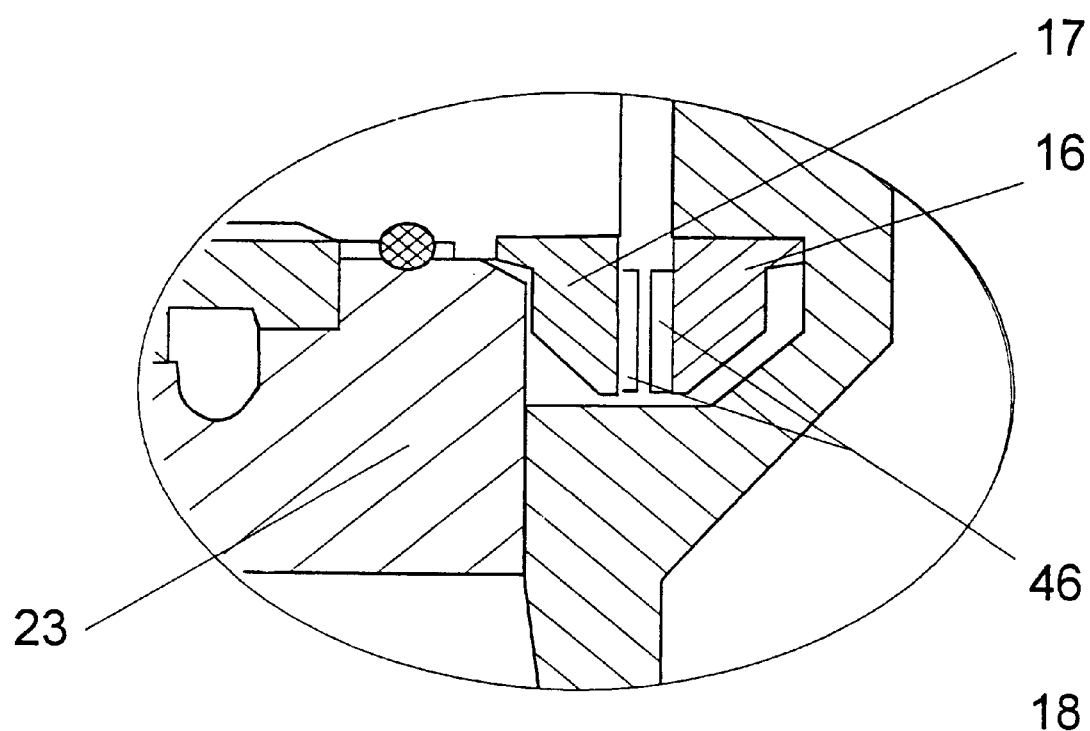
FIG. 2 is a detail II of FIG. 1 shown in enlarged scale.
Figure 3:
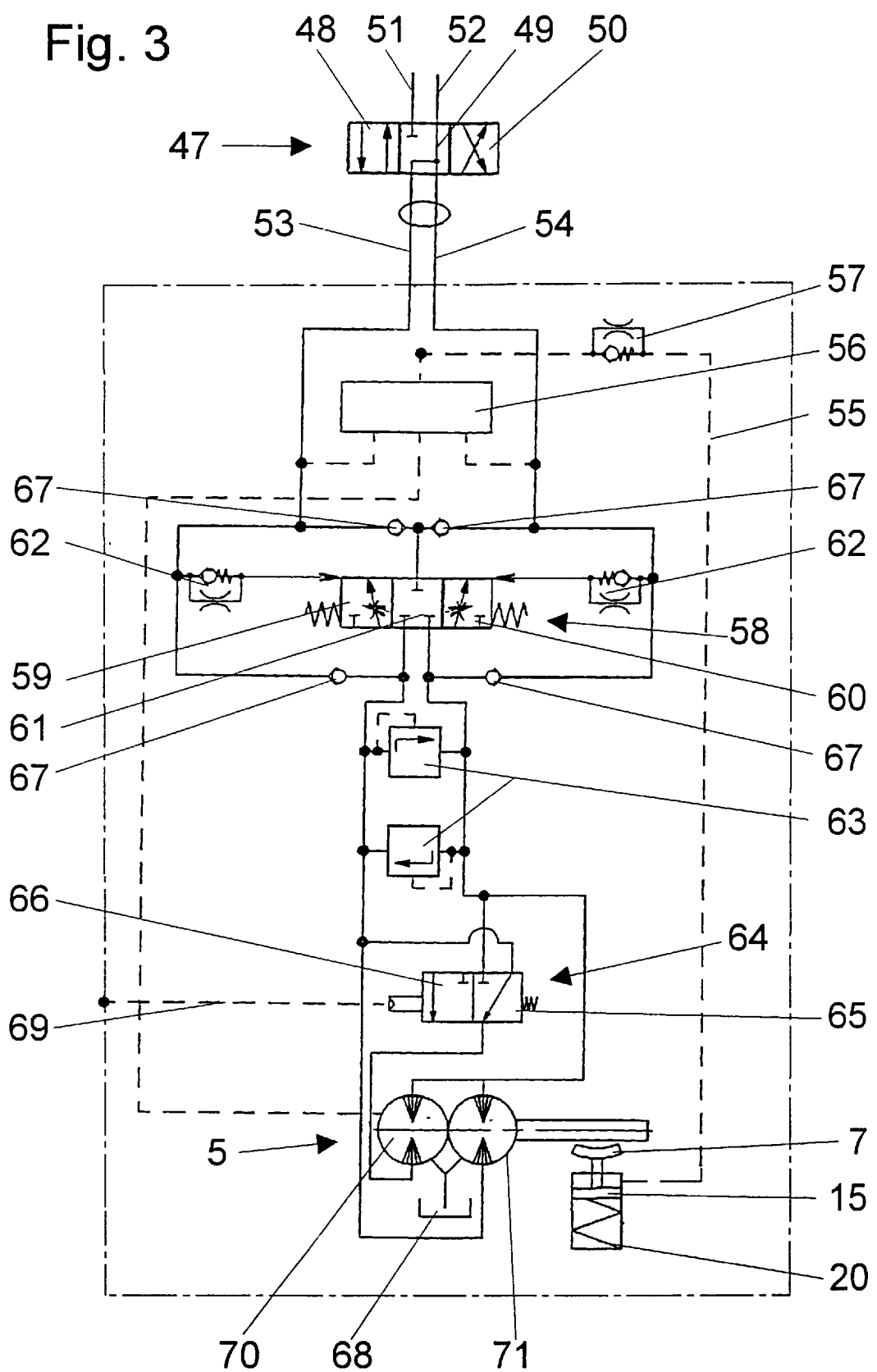
FIG. 3 is a hydraulic selection diagram.

Tracked vehicles have as a rule at their longitudinal sides caterpillars, also called tracks, which are guided by rollers driven by wheel drives via sprocket wheels. The rollers and the wheel drives are supported on or fastened to the vehicle chassis.

The wheel drive essentially consists of a wheel hub support 1 which is fixed with an integrated transmission connector 41, on a support of the vehicle chassis, a hydrostatic lifting piston motor in the form of a radial-piston motor 5 with a cover 2 for a hydraulic connection, valves for control of the radial-piston motor 5, a brake 7, a planet gear 4 and a wheel hub 3. The wheel hub 3, the brake 7 and the radial-piston motor 5 revolve around an axis of rotation 6.

The wheel hub 3 has a wheel flange 8 with bolt holes 9 to secure a wheel rim or a sprocket wheel which meshes in a chain or track of a full-track vehicle. The wheel hub 3 is supported on a bearing neck 12 of the wheel hub support 1 by means of two wheel bearings 10 disposed close together and mounted on a collar 11. A slip ring seal 14 seals the gap formed between wheel hub 3 and the wheel hub support 1. Since the diameters of the wheel bearings 10 are relatively small, the gap also can be sealed off on a small diameter whereby the frictional losses and wear of the slide ring seal 14 are small. The outer end of the wheel hub 3 is closed by a hub cover 13 which is bolted to the wheel hub 3 by bolts 45.

The wheel hub support 1 is fastened or bolted with a transmission connector 41 to the support of the vehicle chassis. It forms with the transmission connector 41 one part of one or more webs 44 integrally molded on its outer peripheral walls, for example, by being forged together, cast on, or welded on. The webs 44 end in a flange 42. The latter extends paraxially relative to the axis of rotation 6 and entirely or partially covers in axial direction the brake 7 the wheel hub 3, the radial-piston motor 5 and the control cover 2. From the axis of rotation 6 there is a radial distance sufficient to enable the sprocket wheel freely to revolve on the wheel flange 8. The wheel drive and the transmission connector 41 are conveniently mounted in the space surrounded by the chain or track. To this end bolt holes 43 are provided. In a wheeled vehicle the wheel hub support 1 is fastened to or hinged on a vehicle axle.

The radial piston motor 5, having a low speed of rotation and high torque, has a stationary cam ring 25 firmly clamped between the wheel hub support 1 and the cover 2 by means of bolts. The cover 2 comprises a valve housing 23 with control ducts 24 which are controlled by a valve spool 22. A control device (not shown), as a rule a microprocessor, produces signals for control. The wheel hub support 1 surrounds, bell-like, the radial-piston motor 5 and the cover 2. An end cover 18 closes the open side of the wheel hub support 1 and of the valve housing 23.

The cam ring 25 is guides a rotary cylinder housing 26 where radial pistons (not visible) move in connectable cylinders 70. The cylinder housing 26 is axially and radially supported on the wheel hub support 1 by taper roller bearing 28.

If the radial pistons are loaded with a pressurized medium, the cylinder housing 26 drives, via spline 31, a sun gear shaft 30 upon which a sun gear 29 is non-rotatably mounted, for example, by being formed on the sun gear shaft 30. The sun gear 29 meshes with planetary gears 33 which are supported by planet bearings 37 in the form of roller bearings on planet pivots 36 of a planet carrier 35. The planetary gears 33 mesh with a ring gear 34 which is non-rotatably connected with the wheel hub 3. The planetary gear 4 is a so-called vertical transmission, that is, the planet carrier 35 does not revolve but is retained by a positive connection 40 on a shoulder 38 which meshes in the bearing neck 12 of the wheel hub support 1.

The sun gear shaft 30, which at one end is supported by the cylinder housing 26 and the bearing 28 in the wheel hub support 1, supported at its other end, via an axial bearing 32 to the hub covering 13. One other roller bearing 39 guides the sun gear 29 and the sun gear shaft 30 on the other end of the planet carrier 35.

The wheel drive has a positive parking brake 7. Thus strong retaining forces can be implemented on small space. However, multi-disc brakes are also possible. A first part 16 of the brake 7 with dog teeth component 46 is non-rotatably fastened to a boss 19 of the cover 18. A second part 17 of the brake 7 with dog teeth components 46, which interact with the first part 16, sits non-rotatably upon a brake piston 15 which for its part directly or via the cylinder housing 26 connects the second part 17 with the sun gear shaft 30. One or more springs 20 bias the brake piston 15 in a closing direction. The springs 20 axially support themselves, via the cylinder housing 26 on the bearing 28, which at the same time serves to support the cylinder housing 26. The brake 7 is housed in a pressure chamber 21 in which is guided the brake piston 15 from its spring-loaded end. If the pressure chamber 21 is pressurized pressure, the brake piston 15 overcomes the force of the springs 29 and opens the brake 7.

The wheel drive has two supply lines 53, 54, which depending on the direction of rotation of the radial-piston motor 5 are pressurized via a steering valve 47. The steering valve 47 has three switching positions; a forward position 48 for forward drive, a neutral position and a reverse position 50 for reverse drive. Since the control for the reverse drive corresponds to the control for the forward drive, details are limited to the description of the forward drive.

In the neutral position 49 the supply lines 53 and 54 are connected with a return flow connection 52 while a pressure connection 51 is shut off. The hydraulic system of the wheel drive is thus pressureless. If the steering valve 47 is adjusted to the forward position 48, the supply line 54 is pressurized and the supply line 53 connected with the return flow connection 52.

A brake line branches off from supply line 54 and houses a pressure-reducing valve 56 and a first throttle check valve. The pressure-reducing valve 56 limits the pressure in the brake line 55 so that the brake 7 is not subject to damage by overpressure. Additionally, the first throttle check valve 57 ensures that the brake be quickly opened as soon as a preset pressure overcomes a prestress of the springs 20 and closes slowly because the pressure in the brake line 55 breaks down more slowly over the throttle in the first throttle check valve 57.

A hydrostatic function is implemented by a brake valve 58 by the supply line 54 which connects the radial piston motor with the return flow connection 52 being shut off when in a brake position 61 with the check valves 67 uncoupling the return flow from the feed-in port. The radial-piston motor 5 works against a counter-pressure which is limited by the pressure-limiting valves 63.

The hydrostatic braking action is maintained until the pressure in the supply line 53 exceeds the preset braking pressure, for example, 10 at, and adjusts the brake valve 58 to forward position 59. Thereby is produced the return flow of the radial-piston motor 5, via the supply line 54, to the return flow connection 52 and the brake function is canceled.

From the supply lines 53 and 54 branch off lines to a selected cylinders 70 of the radial-piston motor as controlled by a displacement change-over valve 64. In a position for a low gear step, the switchable cylinders 70 are connected in parallel with the remaining cylinders 71 so that the radial-piston motor 5 has the largest displacement capacity and the lowest speed range. If the displacement change-over valve 64 is switched, via a control line 69, to a position for a high gear step, the switchable cylinders 70 become connected by the feed in and return flow sides with the return flow connection 52 and the feed of the supply line 53 is shut off. The switchable cylinders 70 are symbolically drawn as motor connected in parallel. Th hydraulic medium flows back from the return flow connection 52 again to the hydraulic pump (not shown). Leakage pressurized fluid is collected in a sump 68 and also led back to the pump.

| Reference numerals | |
|---|---|
| 1 | wheel hub support |
| 2 | cover |
| 3 | wheel hub |
| 4 | planetary gear |
| 5 | radial-piston motor |
| 6 | axis of rotation |
| 7 | dog tooth brake |
| 8 | wheel flange |
| 9 | screw holes |
| 10 | wheel bearing |
| 11 | collar |
| 12 | bearing boss |
| 13 | hub cover |
| 14 | slide ring seal |
| 15 | brake piston |
| 16 | first part |
| 17 | second part |
| 18 | cover |
| 19 | boss |
| 20 | spring |
| 21 | pressure chamber |
| 22 | valve spool |
| 23 | valve housing |

| -continued | |
|---|---|
| Reference numerals | |
| 24 | control ducts |
| 25 | cam ring |
| 26 | cylinder housing |
| 27 | splined engagement |
| 28 | bearing |
| 29 | sun gear |
| 30 | sun gear shaft |
| 31 | spline |
| 32 | axial bearing |
| 33 | planetary gear |
| 34 | ring gear |
| 35 | planet carrier |
| 36 | planet pivot |
| 37 | planet bearing |
| 38 | boss |
| 39 | roller bearing |
| 40 | splined connection |
| 41 | gear connector part |
| 42 | flange |
| 43 | screw holes |
| 44 | web |
| 45 | bolt |
| 46 | dog teeth component |
| 47 | steering valve |
| 48 | forward position |
| 49 | neutral position |
| 50 | reverse position |
| 51 | pressure connection |
| 52 | return flow connection |
| 53 | supply line forward |
| 54 | supply line reverse |
| 55 | brake line |
| 55 | pressure-reducing valve |
| 57 | first throttle check valve |
| 58 | brake valve |
| 59 | forward position |
| 60 | reverse position |
| 61 | brake position |
| 62 | second throttle check valve |
| 63 | pressure-limiting valve |
| 64 | displacement change-over valve |
| 65 | position for a low step |
| 66 | position for a high step |
| 67 | check valve |
| 68 | sump |
| 69 | line |
| 70 | switchable cylinders |
| 71 | cylinder |

What is claimed is:

1. A hydrostatic mechanical wheel drive comprising:
a wheel hub support containing a hydrostatic radial-piston motor (5), the hydrostatic radial-piston motor (5) connected to a wheel hub (3) by a drive shaft to supply drive thereto, and the wheel hub (3) being supported by a first and second wheel bearings on the wheel hub support;
the drive shaft (5) having a first end supporting a brake, the brake being biased, by a spring (20) coupled to a brake piston (15), into an engaged position to stop rotation of the wheel hub (3), valves for controlling operation of said radial-piston motor(5) and said brake (7), said brake piston (15) being opened by a fluid pressure to overcome the biasing force of the spring, and the motor (5) the brake (7) and the valves all being housed in a cover (2) within said hub support; and
wherein said drive shaft having a second end supporting a sun gear for driving said wheel hub via an epicyclic gear, the epicyclic gear comprising a stationary planet carrier (35) fixed to the wheel hub support and supporting rotatable planetary gears, and the wheel hub supports a ring gear meshing with the rotatable planetary gears for supplying drive from the sun gear to the wheel hub.

2. The wheel drive according to claim 1, wherein said brake (7) is controlled by a brake valve (58), and the brake (7) engages when a fluid pressure is below a preset value and engages when said fluid pressure is above said preset value.

3. The wheel drive according to claim 2, wherein a brake line (55), which includes a first throttle check valve (57), interconnects said brake piston (15) with a pressure-reducing valve (56).

4. The wheel drive according to claim 3, wherein a brake valve (58) is actuated by a second throttle check valve (62) and opens a return flow from said radial-piston motor (5) when said fluid pressure rises above said preset value.

5. The wheel drive according to claim 4, wherein said brake valve (58) shuts off a return flow of fluid pressure from said radial-piston motor (5) when the pressure falls below said preset value.

6. The wheel drive according to claim 2, wherein a pressure-reducing valve (63) is connected between said brake valve (58) and said radial-piston motor (5).

7. The wheel drive according to claim 1, wherein a feed line for selected cylinders (70) of said radial-piston motor (5) is shut off when desired by a displacement change-over valve (64) and the feed line is connected with a return flow line.

8. The wheel drive according to claim 1, wherein said brake (7) has first and second parts (16, 17) which interact via dog clutch teeth (46), the first part (16) is connected with said cover (2) and the second part (17) is connected with said sun gear (29).

9. The wheel drive according to claim 8, wherein said second part (17) of said brake (7) is mounted to a brake piston (15) which is coaxial with an axis of rotation (6) of said wheel drive and via a cylinder housing (26) of said radial-piston motor (5) which positively connects said second part (17) and said sun gear (29).

10. The wheel drive according to claim 1, wherein said spring (20) is supported by a bearing (28) which also supports said radial-piston motor (5) on said wheel hub carrier (1).

11. The wheel drive according to claim 1, wherein said brake (7) is housed in an outwardly sealed pressure chamber (21) from which said brake piston (15) is biased by said spring so that said brake (7) disengages as soon as said pressure chamber (21) is loaded with pressure above a predetermined pressure.

12. A hydrostatic mechanical wheel drive comprising:

a wheel hub support containing a hydrostatic radial-piston motor (5) connected by a drive shaft to drive a wheel hub (3) supported by a first and second wheel bearings on the wheel hub support;

the drive shaft (5) having a first end supporting a sun gear and a second end supporting a brake, the brake having a spring (20) acting via a brake piston (15) to bias the brake to a closed position, valves for control of said radial-piston motor (5) and of said brake (7), said brake piston (15) being opened by a pressurized pressure medium overcoming the spring bias, and the motor (5), brake (7) and valves being housed in a cover (2) within said hub support; and wherein a single planetary stage epicyclic gear connects the drive shaft and the wheel hub, the epicyclic gear comprising the sungear driving a stationary planet carrier fixed to the wheel hub support which in turn carries a single stage of planetary gears driving the wheel hub.

* * * * *